Nov. 12, 1929.                T. MONDAY                1,735,542
                GEAR SHIFT LOCKING AND THROW-OUT DEVICE
                        Filed March 21, 1928
*Fig.2.*  *Fig.1.*  *Fig.3.*
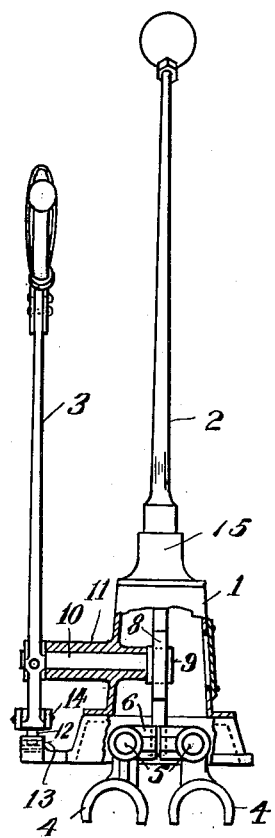
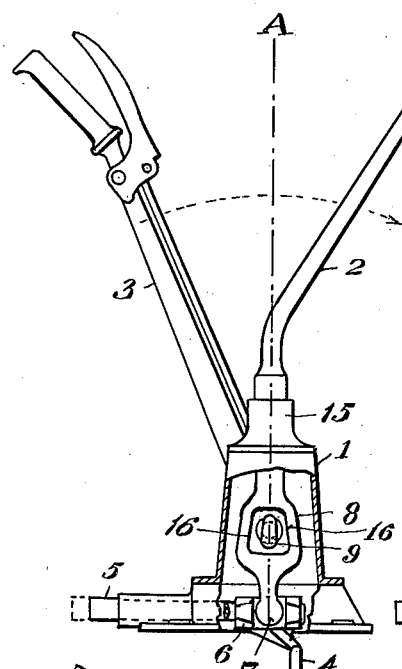
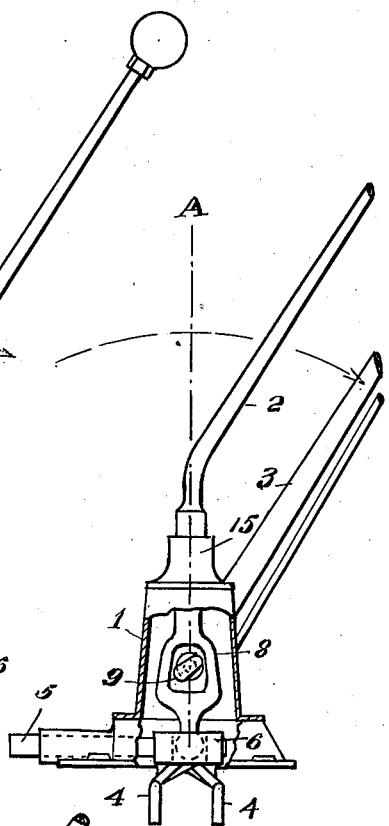
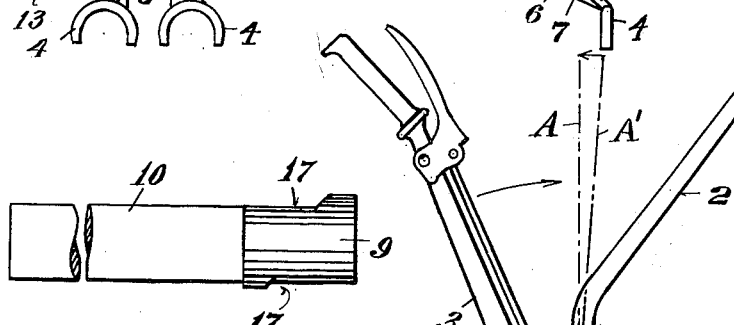
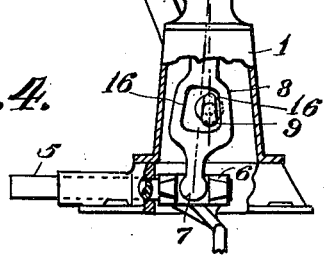
*Fig.5.*  *Fig.4.*
INVENTOR
Tobe Monday,
BY
H. M. Plaisted.
ATTORNEY.

Patented Nov. 12, 1929

1,735,542

UNITED STATES PATENT OFFICE

TOBE MONDAY, OF ST. LOUIS, MISSOURI

GEAR-SHIFT LOCKING AND THROW-OUT DEVICE

Application filed March 21, 1928. Serial No. 263,424.

My invention relates to certain new and useful improvements in gear shift locking and throw-out devices for automobiles and other machines, the peculiarities of which will be hereinafter fully described and claimed.

The main object of my invention is to provide means for interlocking two levers,—such as the hand brake lever and the gear shift lever in automobiles,—whereby the first after being set, must be released before the second can throw the car into gear for starting; secondly, to avoid running the car in gear with the brakes on; and thirdly, to throw the car out of gear automatically and simultaneously by setting the brakes. Other advantages will be described and claimed hereinafter.

This invention applies especially to automobiles but can be used on other machines as a safety device wherever one of two operating levers should be operated first when starting a machine, or when one lever should be operated before the other is thrown in case of emergency or otherwise.

It is a common practice, though faulty, to run a car with the brakes inadvertently set more or less, causing unnecessary wear on the brake bands and wasting power and speed; also, to endeavor to start a car when the brakes have been set on stopping.

My construction prevents these mistakes in operation, promotes efficiency, and reduces unnecessary wear.

In the accompanying drawing on which like reference numerals indicate corresponding parts, Fig. 1 represents a side view of a gear shift lever and an emergency or hand brake lever with gear shift housing in partial section and my improvements applied thereto;

Fig. 2, an edge view of the same;

Fig. 3, a side view of the parts interlocked;

Fig. 4, a side view of the same illustrating the normal operation of the gear shift lever when the hand brake is off but the gear shift lever thrown to engage gears, and indicating the simultaneous operation of the gear shift lever to neutral automatically, upon throwing the hand brake lever; and Fig. 5, an enlarged detail plan view of my cam and shaft.

Referring to the drawing, the numeral 1 designates the usual or any approved form of gear shift lever housing, 2 a gear shift lever, 3 a hand brake lever, 4 shifting forks, and 5—5 shifting shafts. The shifting fork heads are engaged by the lower end 7 of the gear shift lever in the usual way, but I provide a loop 8, preferably closed and forming a substantially vertical oblong opening having cam-engaging sides 16, preferably converging upward, and located between the fulcrum in the cap 15 and said lower end of the lever. In this opening is located a cam 9, mounted on the inner end of a horizontal shaft 10, carried by bearings 11 in the gear shift lever housing or otherwise, and having mounted on the outer end the hand lever of the brake lever assembly with its usual pawl 12, ratchet 13, and rod connection 14.

One of the shifting shafts and fork heads is broken away in Figs. 1 and 4 to show the engagement of the end 7 with the other fork head.

The cam 9 is preferably about twice as deep vertically as it is wide from side to side horizontally, and the said loop is wide enough between said sides 16 to provide sufficient clearance of said sides at each side of the cam when the cam is vertical, to allow normal movement of the gear shift lever in changing the gears to the usual speeds. When the hand brake lever is operated as indicated by the arrow in Fig. 1, the cam is turned so that it is inclined across the loop as illustrated in Fig. 3 so as to bring the upper and lower portions of the cam closely adjacent to the opposing cam-engaging sides 16 of the loop and prevent sufficient movement of the gear shift lever to operate the shifting forks. The gear shift lever is thus locked by the operation of the hand brake lever in setting the brakes, and can not throw in the gears till the hand brake lever is thrown to its former position (Fig. 1), thereby releasing the brakes. After stopping the car and setting the brakes as usual, the car can not be started till the hand brake lever is thrown to release the brakes, which action at the same time unlocks the gear shift lever.

In changing gears the shifting shafts move in and out a varying distance. Therefore I provide recesses 17 on the sides of my cam to allow side clearance for such various movements of the loop of the gear shift lever. The vertical plan view Fig. 5 shows such corresponding recesses of the cam. The sides of the cam preferably converge upward to correspond with the upwardly converging sides 16, and to provide said clearance.

When the gears are set for any speed, the act of setting the hand brake lever will at the same time cause the cam to throw the gear shift lever into neutral position on a vertical axis, previous to locking it in the neutral position. Fig. 4 shows the gear shift lever inclined backward so that the axis A is not in its normal vertical position, and the brakes are not set; but it is evident that the act of throwing the hand brake lever backward in the direction of the arrow, will turn the cam and throw the axis of the loop from its inclined position A′ to its vertical position A: and that such movement of the gear shift lever will automatically throw out the gears, and this will be effected simultaneously with the movement of the hand brake lever in setting the brakes. In case of emergency therefore, only one lever—the hand brake lever,—has to be operated, which may be vitally important to all concerned.

I have shown the hand brake lever as potentially dominant over the gear shift lever,—that is, when the former is operated to set the brakes. At all other times (when the hand brake lever is not thrown,) the gear shift lever is not affected, but can operate the gears freely—moving laterally, forward and backward—in the usual way. With suitable depth and width of cam and corresponding amount of loop clearance, setting the brakes even slightly will so obstruct the gear shift lever that it will be practically impossible to run the car carelessly with the brakes on and wearing out needlessly, as is so often done even by experienced drivers. The saving of power and brake bands is evident.

While I have shown the cam shaft and loop as one form of interconnection between the hand brake lever and gear shift lever, I do not confine myself to this construction, as equivalent interlocking means may be employed and they can be used with other levers than those described, without departing from the spirit of my invention.

It is also evident that the cam and loop with cam-engaging surfaces 16 will be well lubricated by the splash oil from the transmission below the housing. Also that other interposed connections between the cam and hand brake lever than those used may be employed.

In this exemplification of my invention, the two interlocking levers have different movements—the hand brake lever operating in one vertical plane while the gear shift lever operates in multiple planes,—yet they are effectively connected for the purpose desired by my cam mechanism and operative connections.

Another result of locking the gear shift lever in neutral position is that the machine can not be started though the motor be turned on, as the transmission gears are not in mesh. The motor would only idle till the hand brake lever is released and simultaneously frees the gear shift lever for throwing in the gears.

I claim:

1. A device of the character described, comprising a hand brake lever, a gear shift lever having a vertically elongated loop with two cam-engaging surfaces below the fulcrum, a cam only partly rotatable mounted in said loop and adapted to engage interlockingly both said surfaces to prevent movement of the gear shift lever, and operative connections between said cam and hand brake lever.

2. A device of the character described, comprising a gear shift lever having a substantially vertical elongated loop with opposing cam-engaging sides converging upward located adjacent to its lower end, a hand brake lever, and a partly rotatable cam disposed in said loop and operatively connected to said hand lever.

3. A device of the character described, comprising a hand brake lever, a gear shift lever provided with a loop between its fulcrum and its lower end, a cam disposed within said loop on the pivotal axis of and movable with the hand brake lever, and adapted to effect locking engagement with said loop by operating the hand brake lever.

4. A device of the character described, comprising a hand brake lever, a gear shift lever having two opposing cam-engaging surfaces, a cam mounted between said surfaces and having recessed lateral faces between upper and lower contact bearing faces providing for varying throw of said gear shift lever, and operative connections between said hand brake lever and cam.

5. A device of the character described, comprising a gear shift lever having opposing cam-engaging surfaces, a cam disposed between said surfaces and of greater depth than width affording clearance for movement of said lever when vertical and locking engagement with said lever when inclined, and means to operate said cam.

6. A device of the character described, comprising a gear shift lever having opposing cam-engaging surfaces, a cam disposed between said surfaces and of varying width between its sides providing for varying movement of said lever, and means to operate said cam.

7. A device of the character described, comprising a gear shift lever having a substantially vertical oblong loop with upwardly converging sides located between its fulcrum and lower end, locking means disposed in said loop, and actuating means for said locking means.

8. A device of the character described, comprising a gear shift lever having a substantially vertical oblong loop, locking means disposed in said loop adapted to engage both sides of the loop and throw said lever out of any position but neutral prior to locking it in neutral, substantially as described.

In testimony whereof I have affixed my signature.

TOBE MONDAY.